United States Patent [19]

Hrovat et al.

[11] Patent Number: 5,527,238
[45] Date of Patent: Jun. 18, 1996

[54] AUTOMATIC TRANSMISSION BYPASS CLUTCH SLIP CONTROL USING NONLINEAR NVERSE DYNAMICS

[75] Inventors: Davorin D. Hrovat, Dearborn; Daniel S. Colvin, Farmington Hills, both of Mich.

[73] Assignee: Ford Motor Company, Dearborn, Mich.

[21] Appl. No.: 419,163

[22] Filed: Apr. 10, 1995

[51] Int. Cl.$^6$ ..................................... B60K 41/02
[52] U.S. Cl. ............................. 477/166; 477/62; 477/169; 477/181
[58] Field of Search ................. 477/62, 166, 169, 477/174, 175, 181

[56] References Cited

U.S. PATENT DOCUMENTS

| | | |
|---|---|---|
| 4,706,790 | 11/1987 | Lockhart et al. ................. 477/169 X |
| 4,757,886 | 7/1988 | Brown et al. . |
| 4,790,418 | 12/1988 | Brown et al. . |
| 4,792,902 | 12/1988 | Hrovat et al. . |
| 4,936,405 | 6/1990 | Hrovat ................. 477/166 X |
| 5,029,087 | 7/1991 | Cowan et al. ................. 477/169 X |
| 5,121,802 | 6/1992 | Brown et al. . |
| 5,123,302 | 6/1992 | Brown et al. . |
| 5,323,320 | 6/1994 | Hathaway et al. ................. 477/169 X |

Primary Examiner—Charles A. Marmor
Assistant Examiner—Peter Kwon
Attorney, Agent, or Firm—Frank G. McKenzie; Roger L. May

[57] ABSTRACT

In a powertrain including an engine controlled by engine manifold conditions, a hydrodynamic torque converter having a bypass clutch, multiple ratio automatic transmission connected to the drive wheels of the vehicle, a solenoid-operated hydraulic valve, supplying pressurized fluid to engage and release the bypass clutch, is controlled by operation of a feedforward control system. An engine math model produces a signal representing predicted torque output by the engine, which signal is applied as input to an inverse mathematical model of the solenoid-operated valve that supplies hydraulic fluid to the bypass clutch.

8 Claims, 3 Drawing Sheets

AUTOMATIC TRANSMISSION BYPASS CLUTCH SLIP CONTROL USING NONLINEAR NVERSE DYNAMICS

BACKGROUND OF THE INVENTION

1. Field of the Invention

This invention relates to the field of torque converters and the control of a bypass clutch that drivably connects and disconnects the driving and driven members of the torque converter. More particularly, the invention pertains to control of hydraulic pressure supplied to a torque converter bypass clutch.

2. Description of the Prior Art

In an automatic transmission for a motor vehicle, the internal combustion engine is drivably connected to a torque converter having an impeller rotor fixed to the engine shaft and a turbine rotor driven hydrodynamically by the impeller. A typical torque converter also includes a bypass clutch, which, when engaged, mechanically connects the impeller and turbine, thereby discounting the hydrodynamic connection between those components and, when disengaged, permits the conventional hydrodynamic drive between the turbine and impeller.

The torque converter bypass clutch may be controlled through operation of a solenoid-operated hydraulic valve, which pressurizes and vents the bypass clutch to engage and disengage the clutch in response to a signal applied to the solenoid. When the torque converter is opened, i.e., when the bypass clutch is disengaged, the hydrodynamic connection between the turbine and impeller absorbs and attenuates vibrations and other disturbances that are unacceptable in an automotive powertrain. However, because of the inherent losses associated with operation of a torque converter in the open mode, fuel economy is reduced. Torque converters can be controlled such that, throughout most of the range of operation, the bypass clutch is neither fully engaged nor fully disengaged, but instead is modulated to produce a variable magnitude of slip, the difference between the speeds of the impeller and turbine. When operated in this way, the torque converter can be used to absorb vibrations, particularly when gear ratio changes are being made, by increasing the slip, thus permitting a greater portion of engine torque to be passed from the impeller to the turbine through hydrodynamic action. When chance of objectionable vibration and disturbance is absent, the torque converter can be more fully closed so that fuel economy is enhanced.

Generally, a control system for operating the bypass clutch responds to a vehicle operator's demand for a change in engine torque on the basis of changes made manually to the position of the throttle valve. In normal operation, these changes are made abruptly, yet the system must respond quickly to the change in torque demand in order to satisfy the driver's expectations and to satisfy fuel economy and powertrain vibration criteria. Delays are inherent in a powertrain of this type. Intake stroke-to-combustion torque inertia causes a delay in producing a change in engine output in response to a throttle position change, and there are other delays and/or dynamic effects in the control system associated with engine inertia, clutch dynamics, hydraulic system inertia, viscosity, friction, and other such phenomena.

U.S. Pat. No. 5,121,820 describes a closed loop control system for controlling operation of a transmission bypass clutch on the basis of slip across the torque converter using a feedforward strategy based on a linear actuator model and engine torque feedforward model.

U.S. Pat. No. 4,757,886 describes a closed-loop system for controlling operation of a transmission bypass clutch on the basis of slip across the torque converter. The system employs measured slip as a feedback signal combined with a command signal to produce a slip error. Thereafter, a duty cycle correction on the basis of the difference between duty cycles in the current sampling period and the previous sampling period is developed and processed to produce a clutch pressure signal. That signal is used to vary the slip and is fed back to enhance stability of the duty cycle error signal.

U.S. Pat. No. 4,790,418 describes a technique for controlling the transfer of torque from an off-going friction element to an oncoming friction element when a gear ratio change is made in an automatic transmission. Slip across the off-going clutch is used to control engine speed. The time rate of change of torque in the off-going clutch is used as a basis to change clutch pressure in accordance with a calculated torque slope.

U.S. Pat. No. 4,792,902 describes a system and method for controlling ignition timing of an internal combustion engine in a driveline that includes a multiple speed ratio transmission. The spark timing of the engine is advanced and retarded on the basis of engine speed and transmission output speed by a control algorithm that improves the speed ratio control during gear ratio changes.

SUMMARY OF THE INVENTION

In the operation and control of a powertrain, if torque converter slip is too small, then an abrupt engine throttle position disturbance could cause bypass clutch lockup and associated drivability difficulties. One way to maintain desired slip is to employ feedback control using an error signal as a measure of slip across the torque converter bypass clutch. A feedback algorithm for controlling the clutch can employ either classical PID compensation, including lead and lag terms, if required, or a modern compensation technique. To overcome these difficulties and to improve slip control, in comparison to results produced by current practice, the bypass clutch control system of the present invention adds feedforward control on the basis of throttle angle position and engine speed to feedback control. Here, it is proposed to use nonlinear actuator system dynamics to further improve the clutch control and associated benefits leading to improved fuel economy, durability, and drivability.

The control of this invention is adaptable for use in a powertrain including an engine controlled by the position of its throttle valve, a hydrodynamic torque converter having a bypass clutch, and a multiple ratio automatic transmission connected to the drive wheels of the vehicle. A solenoid-operated hydraulic valve, which supplies pressurized fluid to engage and release the bypass clutch, is controlled by operation of a feedforward and feedback control system. The position of the throttle valve and the speeds of the torque converter impeller and turbine are applied as input to a mathematical model programmed in algorithmic form for execution by a digital microprocessor. The engine produces a signal representing the predicted torque output by the engine, which signal is altered by the usually small torque carried by the converter and is then applied as the net torque input to an inverse nonlinear mathematical model of the solenoid-operated valve that supplies hydraulic fluid to the bypass clutch. The unique relationship of phase to gain, the frequency response of the solenoid valve, is inverted to account for inherent and measurable response dynamics and to remove effects of this dynamics. Alternatively, an inversion of a nonlinear map including dead zones could be done using empirical data stored in tables. Slip error is determined as the difference between torque converter impeller speed and turbine speed. The error is applied as input to a PID compensated feedback control or any other suitable control whose output is summed with the inverse of the solenoid valve frequency response to produce a duty cycle or analog current supplied to the solenoid of the bypass pressure hydraulic valve.

In this way, delay in response of the bypass clutch to a change in torque demand on the engine, resulting from a change in the position of the engine throttle, is prevented precisely by anticipating the inherent delay in the system and producing a control duty cycle or control current correction that accounts accurately for the inherent delay associated with the engine torque production and a solenoid and the hydraulic bypass clutch valve that it operates. The feedforward signal is combined with a PID compensation feedback control signal so that the corrected control signal accounts for a change of engine torque and for the delays inherent in the system. The system effectively removes delay by providing a control duty cycle correction that accounts precisely for the phase lag or lead and gain associated with response of the system to engine torque demand.

Nonlinear dynamics is addressed in the present invention by emphasizing control of bypass clutch slip. However, since dynamic effects, such as engine and torque converter torque prediction, are also important for bypass clutch control, it is expected that dynamic effects will also be important for further performance improvements. Therefore, the method of this invention represents a natural and effective extension and generalization of previous efforts.

DESCRIPTION OF THE PREFERRED EMBODIMENT

Figure 1:
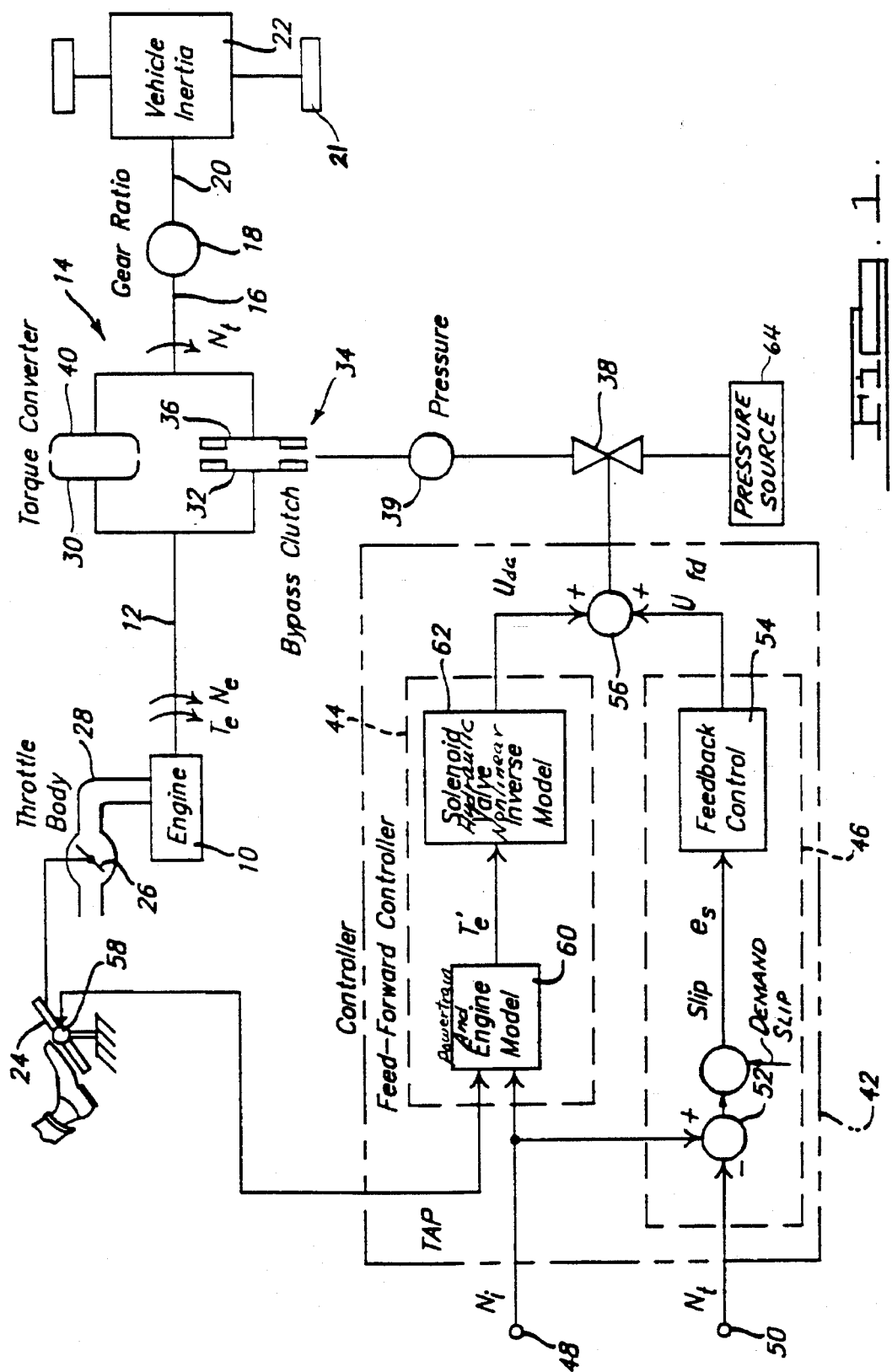
FIG. 1 is a diagram of a closed loop torque converter bypass clutch slip control according to this invention.

FIG. 1 shows the components of a powertrain of an automotive vehicle to which the closed loop bypass clutch control of the present invention can be applied. An internal combustion engine 10 is drivably connected through an engine crankshaft 12 to a torque converter, which is connected by a turbine shaft or transmission input shaft 16 to the transmission gear box 18. The transmission contains multiple speed ratio gearsets, clutches, brakes, a hydraulic control system, solenoid-operated shift valves, a microprocessor, and sensors producing signals representing shaft speeds, throttle position and other operating variables. The gearbox is connected through the transmission output shaft 20 to the drive wheels 21 of the vehicle. In the figure, vehicle inertia 22 is the principal load driven by the powertrain.

The vehicle operator controls the position of an accelerator pedal 24, whose movement changes the position of the throttle valve 26 located in the engine intake manifold.

Power produced by the engine ($T_e$) is carried on engine shaft 12 to the torque converter impeller 30 and to a friction disc 32 of the torque converter bypass clutch 34. The bypass clutch includes a second friction disc 36, which is moved into frictional driving engagement with disc clutch 32 through operation of a solenoid-operated bypass valve 38. The valve produces output pressure supplied to a servo of the bypass clutch, which, when pressurized, forces discs 32 and 36 into frictional driving engagement and, when vented, permits the discs to disengage. The impeller drives a turbine 40 hydrodynamically through hydraulic fluid contained in a casing continually supplied with fluid from the hydraulic circuit as the impeller and turbine rotate about the axis of the torque converter. The circuit includes a pump or other pressure source for pressurizing the hydraulic circuit, various clutches and brakes of the transmission control system, a lubrication system of the transmission gearbox, and the torque converter itself.

A controller 42, which may include a microprocessor accessible to an electronic memory, for controlling operation of solenoid valve 38, includes a feedforward control portion 44 and a feedback control portion 46. The difference between impeller speed ($N_i$) and turbine speed ($N_t$) is called torque converter slip. Speed sensors 48 and 50 produce signals representing impeller speed and turbine speed, which signals are applied as input to a summing junction 52, where their difference, slip $e_s$, is applied as input to a feedback control 54 whose output signal $Y_{fd}$ is applied as input to summing junction 56.

The difference equation implemented in software for the proportional, integral, differential PID compensator 54 is:

$$U_{fd}=U_{fd}(k-1)+K_p[e_s(k)-e_s(k-1)]$$

$$+K_i e_s(k)+K_d[e_s(k)-2e_s(k-1)+e_s(k-2)]$$

wherein $e_s(k)=N_i(k)-N_t(k)$ is slip at sampling instant k;

$N_i(k)$ is impeller speed or engine speed $N_e(k)$ at sampling instant k;

$N_t(k)$ is turbine speed at sampling instant k;

(k−1) refers to the immediately preceding sampling instant;

(k−2) refers to the sampling instant that preceded the immediately preceding sampling instant; and $K_p$, $K_d$ and $K_i$ are proportional, derivative, and integral gains, respectively.

A sensor 58 produces a signal representing the position of the accelerator pedal or throttle valve, the extent to which throttle valve opens the engine intake manifold, the signal, representing either throttle angular position TAP, intake manifold pressure MAP downstream from the throttle valve 26, or mass air flow MAF into the engine, is applied as input to the engine and torque converter mathematic model 60. This model produces an output signal ($T'_e$), net engine torque, which is applied as input to solenoid valve nonlinear inverse model 62. The output $U'_{dc}$ from model 62 is combined at summing junction 56 with the output $U_{fd}$ from the PID control 54 to produce a pulse-width-modulated PWM duty cycle or an analog current, if a variable force solenoid VFS is used. The signal is applied to the solenoid that operates a hydraulic valve 38, which opens and closes communication between a pressure source 64 and bypass clutch 34. The valve produces bypass clutch pressure in accordance with the magnitude of the duty cycle or current applied to the solenoid, thereby controlling transfer of torque between the impeller and turbine as clutch 34 is engaged or disengaged. For example, high bypass clutch pressure may be used to produce clutch engagement and low pressure to produce disengagement.

Engine power delay is an important dynamic effect. Engine dynamic torque can be determined using: (1) calculated instantaneous engine torque $T_e$; or (2) engine power delay, such as power-to-intake delay, to predict the engine torque $T_e$ that will occur $\Delta t_p$ ms after a commanded change in torque, where $\Delta t_p$ is the power delay, which increases with decreasing rotational speed. The second approach is preferred since it effectively acts as a torque disturbance preview, assuming that clutch actuator delays are significantly smaller than $\Delta t_p$, as is usually the case. To fully exploit this preview opportunity, "midground" or similar and faster control computer processing is recommended.

The engine torque prediction model 60 is substantially the same model described in U.S. Pat. No. 5,121,820, assigned to the assignee of this invention, the entire disclosure of which is incorporated herein by reference.

Figure 2:
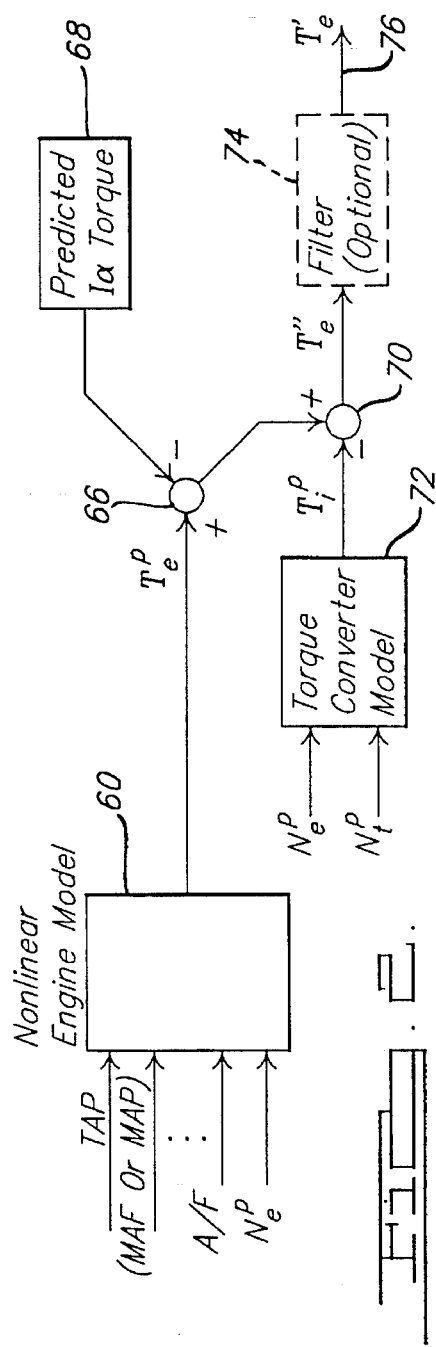
FIG. 2 is a block diagram representing a technique for predicting the magnitude of a torque disturbance in the system of FIG. 1.

A torque disturbance estimation block diagram is shown in FIG. 2. The nonlinear engine block 60 produces a prediction of engine torque $T_e^p$. Several alternative inputs may include electronic signals produced by sensors, the signals representing throttle angle position TAP, estimated air/fuel ratio A/F, current engine speed NE, mass airflow rate MAF, and manifold absolute pressure MAP. The preferred input is the TAP throttle angle position input. Usually, the measured value of NE is used because engine speed changes are small during the relevant computational time interval.

At subtraction junction 66, torque associated with engine and impeller inertia (I$\alpha$) 68 is subtracted from predicted engine torque. The result produced at junction 66 is subtracted at junction 70 by predicted torque converter impeller torque $T_i^p$, which is output from a semiempirical model 72 based on predicted impeller speed $N_e^p$ and turbine speeds $N_t^p$. The result produced at junction 70 can be further reduced by various resistance torques or friction torques. Under good bypass clutch slip control, all subtracting torques change little and relatively slowly so that they can often be neglected and left to a closed-loop slip control to contain. The torque output from junction 70 can be further processed through a low-pass filter 74 to remove any possible high-frequency noise, e.g., from engine impeller inertia torque, etc. The resulting torque is $T'_e$, which is usually a brief disturbance to the bypass clutch control system.

Further refinement in torque determination would consist of using a torque converter dynamic model, which may include torque converter hydraulic inertia effects.

Once the torque disturbance $T'_e$ has been predicted, it can be used as an input 76 to the nonlinear inverse dynamics model 62, illustrated in FIG. 2 for the special case of second-order nonlinear dynamics of the type $$\dot{X}_1 = X_2 \quad (1)$$

$$\dot{X}_2 = -f(X_1, X_2) + K_u(X_1, X_2)\overline{U}_{dc} \quad (2)$$

which often characterizes the bypass clutch dynamics from solenoid duty cycle to the bypass clutch control pressure, wherein $$\overline{U}_{dc} = \{1/K_u\} f(X_1, X_2) + \{\ddot{P}_d - C_2\dot{e} - C_1 e\}\} \quad (3)$$

where $X_1$ is the bypass clutch pressure, the state variable;

$\dot{X}_1$ is the first time rate of change of $X_1$;

$X_2$ is first time rate of change of $X_1$;

e and ė are errors;

$C_1$ and $C_2$ are gains;

$P_d$ is desired bypass clutch pressure;

$\ddot{P}_d$ is the second time rate of change of $P_d$;

$K_u$ is a function of the state variable and its time derivative; and $\overline{U}_{dc}$ is the effective duty cycle.

Upon substituting $\overline{U}_{dc}$ of equation (3) into equation (2), the error compensation becomes $$\dot{X}_2 = \ddot{P}_d - C_2\dot{e} - C_1 e \quad (4)$$

The inverse clutch model 62, a mathematic model relating net engine torque $T'_e$ and desired bypass clutch pressure, represents the bypass clutch pressure present in clutch 34 that would transmit the required net engine torque present at the clutch 34, i.e., the inverse of the response of clutch 34 to a duty cycle applied to the solenoid that controls valve 38. Typically, the model output represents a dead zone shortly after the solenoid is energized, during which desired pressure is low and thereafter rises rapidly to the desired pressure.

Alternatively, the inverse clutch model 62 can be a look-up table of values for desired clutch pressure corresponding to the net engine torque $T'_e$. The static clutch inverse relation between $P_d$ versus $T'_e$ could be and is typically produced empirically through bypass clutch capacity tests. The data resulting from such tests should be smoothed to facilitate taking second derivatives for the expression $P_d = f(T'_e)$.

Figure 3:
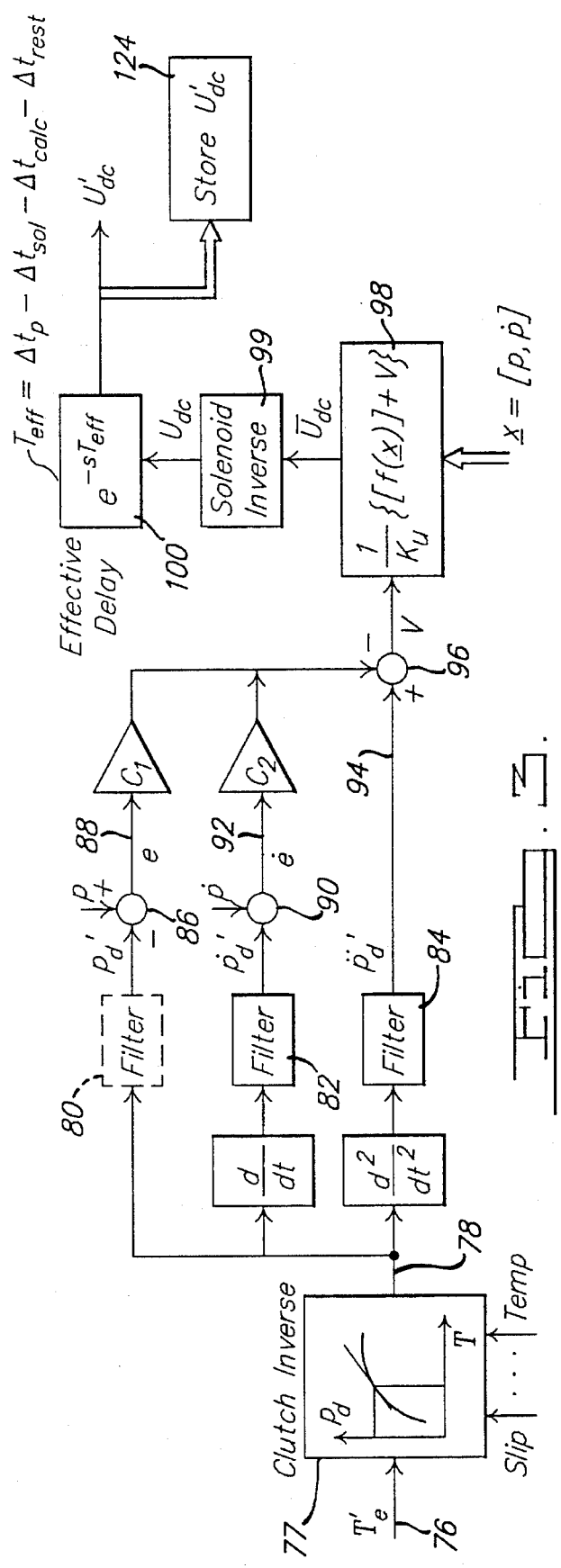
FIG. 3 is a nonlinear, second-order inverse dynamics model.
Figure 4:
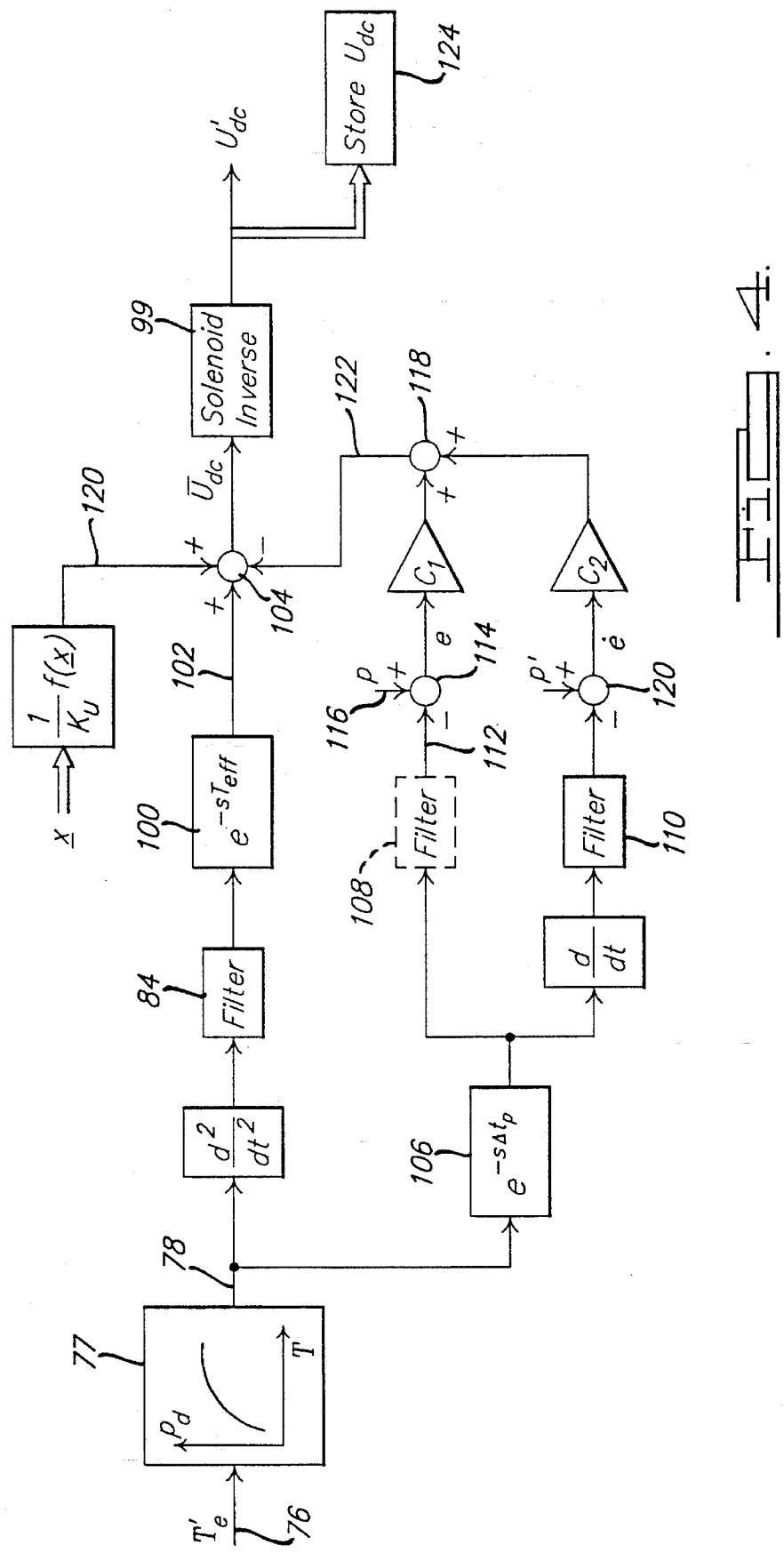
FIG. 4 is a nonlinear, second-order inverse dynamics model i which measured pressure and its derivatives are treated in a branch parallel to the effective torque delay loop.

Although discussed with reference to the second-order bypass clutch mathematic model of FIGS. 3 and 4, the results will be applicable, with obvious modifications, to any higher or lower order bypass clutch model. The logic illustrated in FIGS. 3 and 4 can be written in source code and stored in software modules that are read, interpreted and executed by an electronic microprocessor or computer.

The clutch inverse model 77 relating desired pressure $P_d$ and torque $T'_e$ is, for simplicity, assumed to be a static function, possibly influenced by torque converter slip, temperature, etc. Since these later influences are not always exactly known, they imply that, in addition to the proposed feedforward control, of FIGS. 2 and 3, a slip-based feedback control is required, which can also be based on the proposed nonlinear inverse dynamics. In addition, the static clutch pressure-torque relation 62 could be also nonlinear dynamic to reflect friction force generation dynamics including increased breakaway friction with increased nonslip time or force rate application, which that are sometimes important. The proposed control would have to be modified then, similarly to the inverse path proposed for the bypass clutch hydraulics.

The measured or estimated desired bypass clutch pressure on line 78 may have to be filtered at 80, 82, 84, especially in the case of clutch pressure derivatives, which are used to produce less noisy error derivatives.

From summing junction 86, the difference e between desired bypass clutch pressure 78 and bypass clutch pressure is carried on line 88 to gain $C_1$. From summing junction 90, the difference ė between the time rate of change of desired measured bypass clutch pressure and the first time derivative of bypass clutch pressure is carried on line 92 to gain $C_2$.

The control gains $C_1$ and $C_2$ reflect the resulting ideally linear dynamics of the clutch pressure error. Gains $C_1$ and $C_2$ are control parameters for a damped system. When $C_1$ is large, the error response is fast; if $C_2$ is large, the error dynamics is fully damped.

In reality, there will always be some model mismatch so that these dynamics will not exactly hold. To make the system more robust with respect to the mismatch and hardware changes, this nonlinear inverse procedure could be coupled with the μ-synthesis or other robust linear control systems design techniques. Alternatively, to counteract uncertainties, one could consider adaptive control algorithms.

The second time rate of change of desired bypass clutch pressure is carried on line 94 to junction 96, where they are combined algebraically with error signals e and ė to produce error compensation signal V. Bypass clutch pressure p, and its first time derivative ṗ and the error compensation signal V are used in the linearization signal written box 98 to produce an effective duty cycle $\overline{U}_{dc}$, which is applied as input to solenoid inverse model 62. The duty cycle $\overline{U}_{dc}$ is output by model 99.

The solenoid inverse model 99 can be a simple static inverse, or it could also include the solenoid dynamics following a similar process as described with reference to FIG. 3.

The solenoid delay, e.g., from pulse-width modulation, if important, could be included in the effective overall delay 100 $T_{eff}$. The effective delay $T_{eff}$ includes engine torque production delay $\Delta t_p$, solenoid delay $\Delta t_{sol}$, computer calculation delay $\Delta_{calc}$, and the rest-of-the-system delay $\Delta t_{rest}$. For a high quality implementation, all those other delays should be significantly smaller than $\Delta t_p$, leading to a positive $T_{eff}$. The inverse duty cycle $U'_{dc}$ is an effective preview of the incoming torque disturbance at clutch 34.

In the case of duty cycle signal $U'_{dc}$ saturation, the following is proposed. The simplest alternative would be to hold $U'_{dc}$ constant until the underlying demand changes sign. Alternatively, use the $T_{eff}$ preview by storing the $U'_{dc}$ data for a period equal to $T_{eff}$, and then alter it after saturation is detected. A simpler alternative would be to rescale or alter these data so they act in the direction against saturation. Alternatively, one could evoke optimization, or parameter optimization, of this discretized $U'_{dc}$ sequence.

In the case of a severe negative-slope clutch torque versus slip relationship 77, with limited-bandwidth bypass clutch hydraulic actuators, it will, in general, not be possible to stabilize surge and other resulting oscillations. However, the bandwidth is a function of amplitude in the sense that smaller amplitudes lead to larger bandwidth. The proposed, more accurate, nonlinear compensation will lower the slip amplitudes as the result of system key disturbance, i.e., engine torque variations. Thus, indirectly, this will improve system stability for bypass clutch hardware.

Although here used for bypass clutch slip control, a similar approach could also be applied to transmission shift control.

The nonlinear bypass clutch control described with reference to FIG. 3 assumes, for the purpose of feedback linearization, that the effect of subsequent control effective delay is negligible. If this is not the case, then the following embodiment can be used.

Cancellation of the nonlinear term f(x) should be performed outside the path that includes delay 100, i.e., in a branch or path parallel to the delay loop. The measured or estimated p(t) is used to reconstruct the state vector. An alternative to this uses the measured clutch pressure p(t) directly, along with ṗ, in a parallel path or branch outside the $T_{eff}$ delay loop as shown in FIG. 4. Again, this structure could be extended in a straightforward manner to the case of higher-than-second-order system models.

Clutch inverse model 77 produces the desired clutch pressure $P_d$ on line 78 in response to $T'_e$ input. The second derivative with respect to time of desired clutch pressure is filtered at 84 and delayed at 100 by the effective delay described with reference to FIG. 4 to produce a signal carried on line 102 to junction 104.

The bypass clutch pressure error terms (for error dynamics) are calculated by using predicted bypass clutch pressure p and its derivatives predicted values, where the prediction extends ahead for the effective control delay period. The prediction starts with the current measured (or estimated) clutch pressure and propagates under the assumption of ideal postulated error dynamics.

The bypass clutch pressure error terms are determined from the desired clutch pressure 78 output from model 77. A delay 106, representing engine combustion delay $\Delta t_p$, is applied before the path that includes filter 108 and the path than includes filter 110. The delayed desired clutch pressure signal on line 112 is summed at junction 114 with a clutch pressure signal 116 to produce error e, which is combined with gain $C_1$ and applied to junction 118. The first time derivative of delayed desired clutch pressure output from filter 110 is summed at junction 120 with a signal representing the first time derivative of clutch pressure to produce error ė, which is combined with gain $C_2$ and applied to junction 118.

The linearization signal on line 121, corresponding to the state variables p and ė, is summed at junction 104 with the signal on line 102 and the error signal on line 122 to produce the duty cycle $\overline{U}_{dc}$, which is supplied to solenoid inverse model 99 to produce the nonlinear dynamics feedforward duty cycle $U'_{dc}$.

Duty cycle $U'_{dc}$ data acquired over the delay interval $T_{eff}$ is stored as indicated at 124.

If needed, the above proposed nonlinear controls can be made more robust with respect to model uncertainty, unpredicted changes, etc., by employing sliding mode controls. This would, in practice, be done with the help of a boundary layer to avoid high-frequency chatter and related noise.

It is understood that although the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

We claim:

1. A system for controlling a torque converter bypass clutch operating in an automatic transmission adapted for connection to an engine controlled by a variable position throttle, comprising:

a torque converter having an impeller adapted for connection to the engine, a turbine adapted for hydrokinetic connection to the impeller, and a clutch whose full engagement mechanically connects the impeller and turbine and whose full release mechanically disconnects the impeller and turbine, partial engagement of the clutch permitting a difference in speed or slip between the impeller and turbine;

a source of hydraulic pressure;

an electrical solenoid-operated valve opening and closing communication between the pressure source and clutch, for producing a variable magnitude clutch pressure in the clutch in response to a duty cycle applied to the solenoid;

means for producing signals representing impeller speed, turbine speed, clutch pressure, and throttle position;

an engine model responsive to the signals representing engine manifold conditions and engine speed for producing a signal representing predicted engine torque;

a powertrain model responsive to turbine speed, impeller speed, and predicted engine torque for producing a signal representing net engine torque;

an inverse clutch model responsive to said signal representing net engine torque for producing desired clutch pressure corresponding to net engine torque;

a nonlinear inverse model responsive to said desired clutch pressure signal, current clutch pressure and derivatives of current clutch pressure with respect to time, for producing a first duty cycle; and a solenoid inverse model responsive to said first duty cycle signal for producing a second duty cycle having a nonlinear relation to the first duty cycle.

2. The system of claim 1 further comprising an effective delay module for delaying production by the solenoid inverse model of the second duty cycle in relation to the first duty cycle to account for delay in response of said system to a command for change in engine torque.

3. The system of claim 2 wherein the delay produced by said effective delay module solenoid accounts for delay in response of the engine to a commanded change in engine torque and delay in response of the solenoid to the duty cycle.

4. The system of claim 1, further comprising:

feedback control means supplied with a slip error signal representing a difference between an actual slip and a commanded slip, for producing a third duty cycle;

means for summing the second duty cycle and third duty cycle and producing a corrected duty cycle control signal therefrom; and means for controlling the speed difference across the torque converter by supplying said corrected duty cycle to the solenoid.

5. The system of claim 2 wherein the feedback control means includes compensator means for phase and gain compensating the slip error duty cycle including a proportional, integral, differential compensator.

6. A system for controlling a torque converter bypass clutch operating in an automatic transmission adapted for connection to an engine controlled by a variable position throttle, comprising:

a torque converter having an impeller adapted for connection to the engine, a turbine adapted for hydrokinetic connection to the impeller, and a clutch whose full engagement mechanically connects the impeller and turbine and whose full release mechanically disconnects the impeller and turbine, partial engagement of the clutch permitting a difference in speed or slip between the impeller and turbine;

a source of hydraulic pressure;

an electrical solenoid-operated valve opening and closing communication between the pressure source and clutch, for producing a variable magnitude clutch pressure in the clutch in response to a duty cycle applied to the solenoid;

means for producing signals representing impeller speed, turbine speed, clutch pressure, and throttle position;

an engine model responsive to the signals representing engine manifold conditions and engine speed for producing a signal representing predicted engine torque;

a powertrain model responsive to turbine speed, impeller speed, and predicted engine torque for producing a signal representing net engine torque;

an inverse clutch model responsive to said signal representing net engine torque for producing a signal representing desired clutch pressure corresponding to net engine torque;

a nonlinear inverse model including effective delay means for delaying, for a period representing delay in response of said system to a command for change in engine torque, solenoid delays and computational delays, production of a signal representing the second derivative of current bypass clutch pressure with respect to time, engine delay means for delaying, for a period representing delay in response of the engine to a command for change in engine torque, production of a signal representing an error compensation signal, and means for producing a first duty cycle comprising the sum of the signals produced by the effective delay module and engine delay module; and a solenoid inverse model responsive to said first duty cycle signal for producing a second duty cycle having a nonlinear relation to the first duty cycle.

7. The system of claim 6, further comprising:

feedback control means supplied with a slip error signal representing a difference between an actual slip and a commanded slip, for producing a third duty cycle;

means for summing the second duty cycle and third duty cycle and producing a corrected duty cycle control signal therefrom; and means for controlling the speed difference across the torque converter by supplying said corrected duty cycle to the solenoid.

8. The system of claim 6, wherein the feedback control means includes compensator means for phase and gain compensating the slip error duty cycle including a proportional, integral, differential compensator.

* * * * *